(12) United States Patent
Pischinger et al.

(10) Patent No.: US 7,047,916 B2
(45) Date of Patent: May 23, 2006

(54) TWO-STROKE INTERNAL COMBUSTION ENGINE WITH FREE OPPOSED PISTONS

(75) Inventors: Franz Pischinger, Aachen (DE); Peter Hofbauer, West Bloomfield, MI (US)

(73) Assignee: FEV Motorentechnik GmbH, Aachen (DE)

( * ) Notice: Subject to any disclaimer, the term of this patent is extended or adjusted under 35 U.S.C. 154(b) by 0 days.

(21) Appl. No.: 11/132,426

(22) Filed: May 19, 2005

(65) Prior Publication Data

US 2005/0257759 A1    Nov. 24, 2005

Related U.S. Application Data

(63) Continuation of application No. PCT/EP03/011872, filed on Oct. 25, 2003.

(30) Foreign Application Priority Data

Nov. 20, 2002    (DE) ................................ 102 54 037

(51) Int. Cl.
*F02B 71/00*    (2006.01)
(52) U.S. Cl. .................. 123/46 R; 123/46 B
(58) Field of Classification Search ............. 123/46 R, 123/46 B, 46 E
See application file for complete search history.

(56) References Cited

U.S. PATENT DOCUMENTS

| | | | | |
|---|---|---|---|---|
| 2,510,127 A | * | 6/1950 | Mercier | 417/341 |
| 3,347,215 A | * | 10/1967 | Pescara | 123/46 R |
| 3,501,087 A | * | 3/1970 | Benaroya | 123/46 R |
| 3,541,362 A | * | 11/1970 | Pouit | 310/15 |
| 4,385,597 A | | 5/1983 | Stelzer | |
| 4,873,822 A | * | 10/1989 | Benaroya | 123/46 R |
| 5,287,827 A | * | 2/1994 | Almendinger et al. | 123/46 R |
| 5,341,788 A | * | 8/1994 | Uchida | 123/692 |
| 6,170,443 B1 | | 1/2001 | Hofbauer | |
| 6,370,869 B1 | * | 4/2002 | Hirota et al. | 60/276 |

FOREIGN PATENT DOCUMENTS

| | | |
|---|---|---|
| DE | 694221 | 7/1940 |
| DE | 1049150 | 1/1959 |

(Continued)

*Primary Examiner*—Noah P. Kamen
(74) *Attorney, Agent, or Firm*—Venable LLP; Robert Kinberg; Steven J. Schwarz

(57) ABSTRACT

A two-stroke internal combustion engine comprises a first cylinder and a second cylinder arranged on a common axis. A first piston pair comprises a first piston and a second piston located in the first cylinder and defining a first combustion chamber. The first piston and the second piston of the first piston pair move in opposite directions within the first cylinder. A second piston pair comprises a first piston and a second piston located in the second cylinder and defining a second combustion chamber. The first piston and the second piston of the second piston pair move in opposite directions within the second cylinder. The first piston of the first piston pair is connected to the second piston of the second piston pair by a first connecting rod. The second piston of the first piston pair is connected to the first piston of the second piston pair by a second connecting rod. A fuel supply is connected to at least one of the first cylinder or the second cylinder. At least one of the first cylinder or the second cylinder includes a first end and a second end. A plurality of inlet openings define an inlet plane proximate the first end. A plurality of exhaust openings are located proximate the second end. The fuel supply injects fuel proximate to the first end.

21 Claims, 5 Drawing Sheets

FOREIGN PATENT DOCUMENTS

| | | |
|---|---|---|
| EP | 0224142 | 6/1987 |
| GB | 872739 | 7/1961 |
| JP | 57206733 | 12/1982 |
| WO | WO 00/01933 | 1/2000 |

* cited by examiner

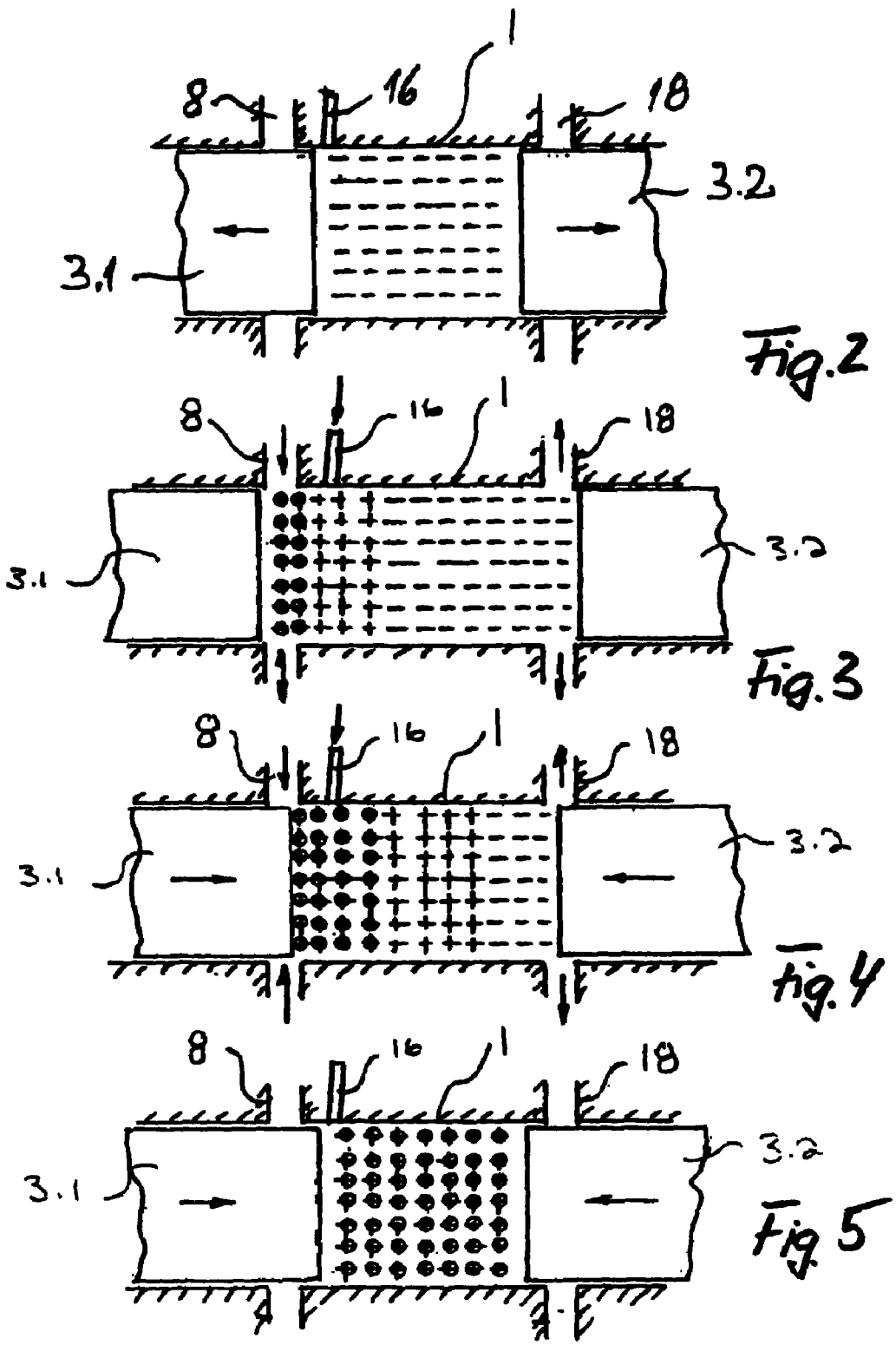

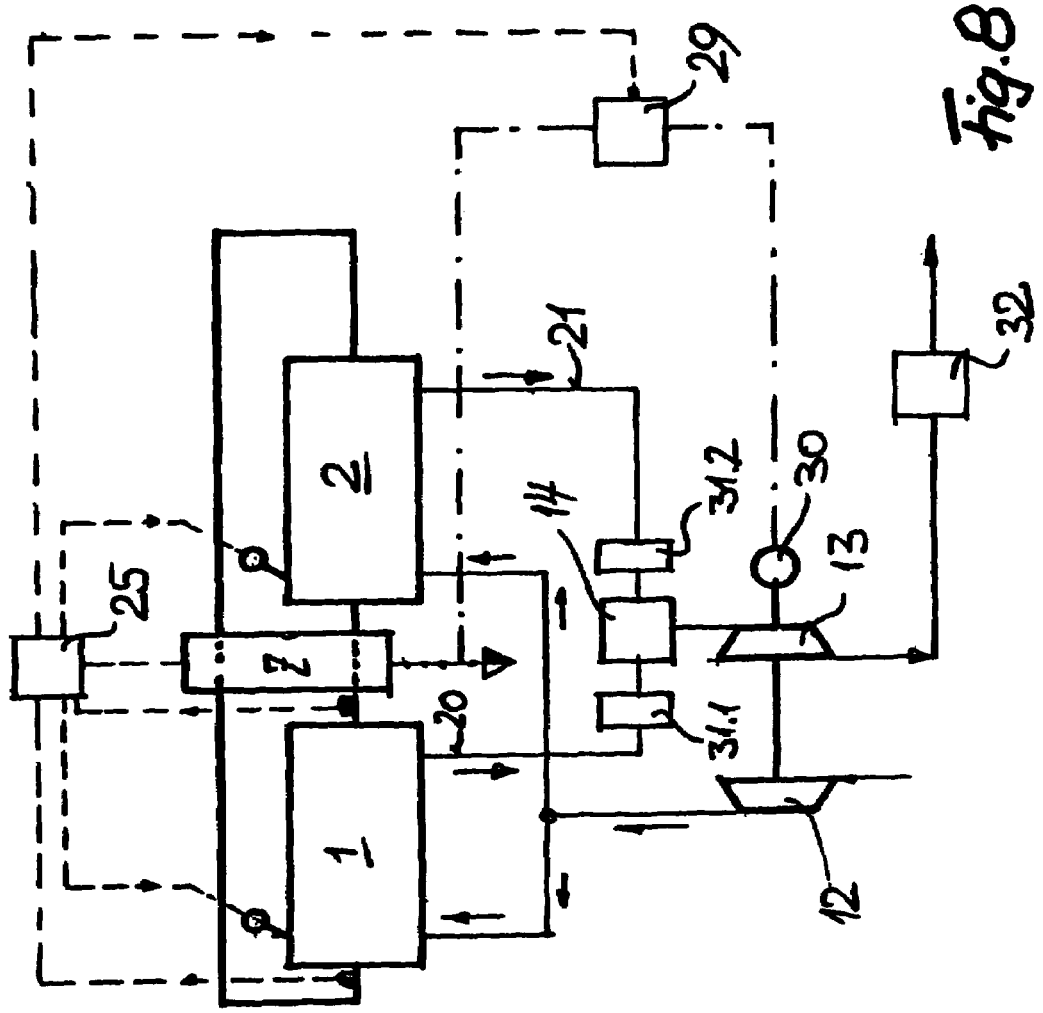

TWO-STROKE INTERNAL COMBUSTION ENGINE WITH FREE OPPOSED PISTONS

CROSS-REFERENCE TO RELATED APPLICATIONS

The present application is a continuation of International Patent Application No. PCT/EP2003/011872, filed on Oct. 25, 2003, designating the United States and claiming priority of German Patent Application No. 102 54 037.3, filed on Nov. 20, 2002, priority of which is claimed by the present application. The disclosures of both of the foregoing applications are hereby incorporated herein by reference in their entirety.

BACKGROUND OF THE INVENTION

A two-stroke internal combustion engine having opposed pistons in a boxer-style engine is known from U.S. Pat. No. 6,170,443. This prior art patent discloses a drive engine having two cylinders arranged one behind the other on the same axis, with each of the cylinders having an opposed piston pair. The individual pistons that move in the same direction are connected by way of a crank arm for a crankshaft, to achieve a forced guidance. Each piston pair defines a combustion chamber in the respective cylinder, so that with an alternate firing of the cylinders, the two respectively connected pistons of both piston pairs move back and forth in an opposing manner, wherein the movement energy is transferred to the crankshaft for driving purposes. Fuel is supplied by injecting it into the combustion chamber when both pistons of a respective piston pair are in the upper dead center position. The operation and control of an internal combustion engine of this type is standard, with self-ignition being the preferred method for starting the engine.

With the engine disclosed in the '443 patent, a predefined compression ratio is maintained in each case due to the forced guidance of the piston movement via the crankshaft, so that the operating parameters required for the self-ignition method, such as compression, temperature, type of fuel, and manner in which the fuel is injected, are fixed for all practical purposes. In addition, a high-pressure injection device must be provided for the fuel supply since the fuel is injected in the respective cylinder when the pistons are in the upper dead center position.

Accordingly, there is a need in the art for an internal combustion engine that offers a broad application range along with stable operation.

SUMMARY OF THE INVENTION

The present invention is directed to a two-stroke internal combustion engine comprising: a first cylinder and a second cylinder arranged on a common axis; a first piston pair comprising a first piston and a second piston located in the first cylinder and defining a first combustion chamber, the first piston and the second piston of the first piston pair moving in opposite directions within the first cylinder; a second piston pair comprising a first piston and a second piston located in the second cylinder and defining a second combustion chamber, the first piston and the second piston of the second piston pair moving in opposite directions within the second cylinder, wherein the first piston of the first piston pair is connected to the second piston of the second piston pair by a first connecting rod, and the second piston of the first piston pair is connected to the first piston of the second piston pair by a second connecting rod; and a fuel supply connected to at least one of the first cylinder or the second cylinder; wherein at least one of the first cylinder or the second cylinder includes a first end and a second end, and includes a plurality of inlet openings defining an inlet plane proximate the first end, and a plurality of exhaust openings located proximate the second end, and the fuel supply injects fuel proximate to the first end.

Since the two pistons of each piston pair are not connected, there is no defined, set compression ratio and thus also no defined upper and lower dead center position. Thus, the compression ratio is variable within certain limits, provided the inlet openings and the exhaust openings are appropriately positioned.

One essential advantage of the internal combustion engine according to the present invention is that only a low-pressure system is needed since the fuel is supplied to the cylinders proximate the inlet plane. Following the intake of air, the fuel feed discharge (for example, from one or more injection nozzles) is covered up by the piston moving toward the upper dead center position, so that the pressure increase resulting from the opposing movement of the other piston of the piston pair can no longer affect the fuel supply.

As a result, fuel can be supplied in a variety of ways, for example by feeding it into an air-inlet port outside of the cylinder, wherein the fuel can then be supplied by means of a standard-design carburetor or by means of injection.

The fuel can furthermore also be injected directly into the cylinder chamber, wherein according to the invention one or several injection nozzles can be arranged in the plane of the inlet openings. The injection nozzle openings in this case are also covered by the piston moving toward the upper dead center position. It is even possible to arrange the injection nozzles additionally at a distance to the air-intake plane—relative to the compression movement of the first piston moving across the inlet plane—since the pressure increase from movement of the first piston toward the upper dead center position is still relatively low. Thus, injection nozzles having relatively low injection pressures can still be used.

Another advantage is that the point in time for the injection can be delayed, so that fuel is injected at a point in time when the exhaust openings have already been covered by the second piston of the piston pair. The fuel is mixed well in that case, corresponding to the geometry selected for the inlet openings and the resulting swirling of the air.

Different, engine-related control values can be specified for the compression ratio by using a sensor system to detect relevant data concerning the piston movements and by using a corresponding controller for controlling the operation of the internal combustion engine. As a result, it is also possible to operate an internal combustion engine using different types of fuel by correspondingly specifying the control values within the range of the compression ratio. The critical compression ratio for the self-ignition of the selected fuel can respectively be varied since the two connected pistons, which move in the same direction, can move freely in a cylinder where the individual pistons of a piston pair otherwise move in opposing directions.

If the internal combustion engine is used for driving an energy converter, for example an electric generator, it is possible to use the energy converter for executing some of the control operations during a single operating cycle. This is possible, for example, when using the sensor system in connection with the control unit, and by detecting the piston position and the piston movement in the cylinder (in particular the movement of the piston dependent on time). For example, the generator can be operated, as needed, as a motor for driving the internal combustion engine (even during a single operating cycle) by supplying it with a corresponding clocked voltage. Alternatively, the generator can be operated, as needed, as a generator, in which case it effectively functions as piston brake. As a result, extremely fast, sensitive control of the operating behavior, and thus stable operation, of the engine is possible, even though the movement of the two pistons of each piston pair is not guided, as is the case with conventional engines in which the pistons are guided by a crankshaft.

BRIEF DESCRIPTION OF THE DRAWINGS

These and other features and advantages of the invention will be further understood from the following detailed description considered in conjunction with the accompanying drawings, which disclose exemplary embodiments of the invention.

FIG. 2 shows a cylinder during an expansion stroke;

FIG. 3 shows a gas reversing operation in a lower dead center region;

FIG. 4 shows gas flow through a cylinder just prior to the end of a scavenging operation;

FIG. 5 shows a cylinder during a compression stroke;

FIG. 8 shows a piston internal combustion engine according to FIG. 1, provided with a catalytic converter unit that comprises a nitrogen-removing catalytic converter and an oxidation-type catalytic converter.

DETAILED DESCRIPTION OF THE INVENTION

Figure 1:
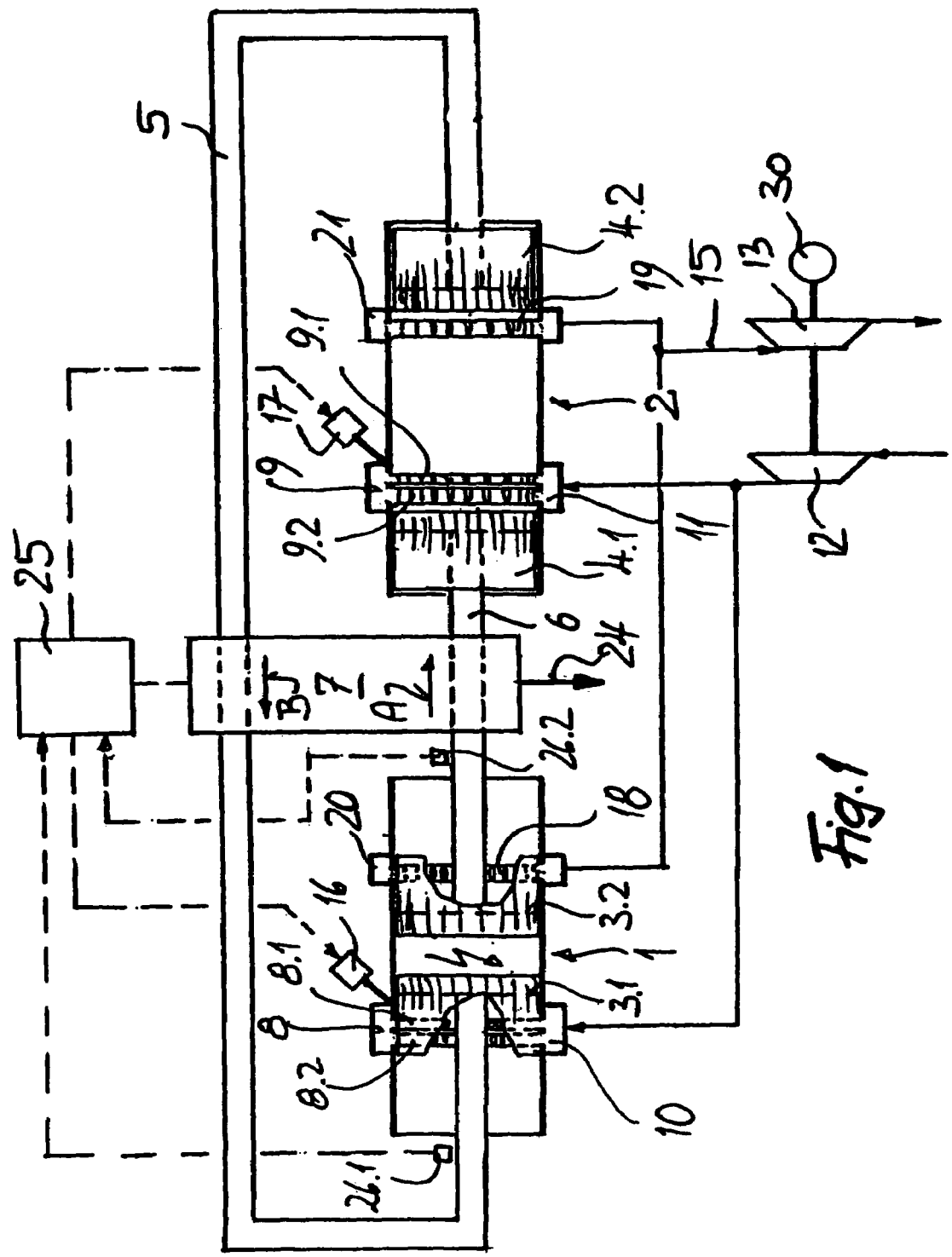
FIG. 1 schematically illustrates an exemplary internal combustion engine according to the present invention, shown being used as a drive unit for an energy converter.

Referring to FIG. 1, an exemplary internal combustion engine according to the present invention is shown. The internal combustion engine includes two cylinders 1 and 2, arranged one behind the other on a common axis. Cylinder 1 contains a piston pair 3 comprising pistons 3.1 and 3.2, and cylinder 2 contains a piston pair 4 comprising pistons 4.1 and 4.2. The individual pistons of each pair 3, 4 move back and forth in opposing directions. The pistons 3.1 and 4.2 can be connected to one another by way of connecting rod 5, and the pistons 3.2 and 4.1 can be connected to one another by way of connecting rod 6. As a result, pistons 3.1 and 4.2 move in the same direction, and pistons 3.2 and 4.1 move in the same direction. Accordingly, the pistons of each piston pair move in opposing directions.

The connecting rods 5 and 6 transfer their movement energy to an energy converter 7. Energy converter 7 can be a gear designed to cooperate with a downstream engine, or alternatively, it can be a system which directly converts the movement energy of connecting rods 5 and 6 into electrical energy, for example, an electric generator such as a linear generator.

Still referring to FIG. 1, each piston pair 3, 4 defines a combustion chamber. In the exemplary embodiment shown, the internal combustion engine is in operation, following the ignition of a fuel-air mixture at the start of the expansion stroke in cylinder 1. Accordingly, the two pistons 3.1 and 3.2 are pushed apart by the gas pressure in cylinder 1, while the two pistons 4.1 and 4.2 in cylinder 2 correspondingly move toward one another.

For the charge change, cylinder 1 and cylinder 2 are each provided with at least one row of inlet openings, respectively distributed across the circumference and forming an inlet plane 8 for cylinder 1 and an inlet plane 9 for cylinder 2. The inlet openings for cylinder 1 are connected to an air feed 10, and the inlet openings for cylinder 2 are connected to an air feed 11. In the exemplary embodiment shown in FIG. 1, inlet plane 8 includes two rows of inlet openings 8.1, 8.2 and inlet plane 9 includes two rows of inlet openings 9.1, 9.2. The first pistons 3.1, 4.1 of each piston pair move during operation across the associated inlet plane, 8, 9, respectively, thereby covering and uncovering the openings.

As shown in the exemplary embodiment of FIG. 1, the air feeds 10, 11 can each be provided with a port arrangement in the form of a ring-type duct that encircles the inlet planes 8, 9, respectively, on the outside of the respective cylinder. The ring-type ducts can be connected to a compressor, for example, an exhaust-gas turbocharger including a charger 12 and an exhaust gas turbine 13.

Each piston pair 3, 4 delimits a combustion chamber. In the exemplary embodiment shown, fuel is directly injected into each combustion chamber via controllable injection nozzles 16, 17. Injection nozzles 16, 17 discharge fuel into the region of inlet planes 8, 9, respectively, of each cylinder. As shown in FIG. 1, during the expansion stroke in cylinder 1, the outlets for the fuel injection nozzle 16 are covered up by the piston 3.1, while the outlets for fuel injection nozzle 17 are exposed in cylinder 2 (that is until piston 4.1 is pushed by connecting rod 6 and piston 3.2 across the discharge opening for the fuel injection nozzle 17). It can be advantageous to have an arrangement of several injection nozzles 16, 17 in each cylinder.

Exhaust openings 18, 19 are distributed across the circumference of cylinders 1, 2, respectively. Exhaust openings 18, 19 can be located at the opposite ends of cylinders 1, 2, respectively, from inlet planes 8, 9, respectively. Exhaust openings 18, 19 can empty into an arrangement of exhaust ports 20, 21, respectively, that are connected to the exhaust gas turbine 13 of the exhaust gas turbocharger.

During the expansion stroke in cylinder 1, the piston 4.1 moves in the direction of arrow A, while piston 4.2 moves in the direction of arrow B. Upon moving a sufficient distance within the cylinder 2, piston 4.2 covers up the exhaust openings 19 in cylinder 2, thereby compressing the fuel-air mixture inside cylinder 2 to a predetermined critical compression ratio, and causing the self-ignition operation to begin. The piston movement is then reversed accordingly.

A controller 25 is provided to stabilize operation, and to control the fuel supply proportionally to the power output 24 from energy converter 7 to a consumer. The controller 25 is connected to sensors 26.1 and 26.2. Sensors 26.1 and 26.2 detect the movement of pistons 3.1, 3.2 with respect to their individual positions relative to the piston travel distance, the movement sequence in dependence on the time, the movement sequence over the traveled distance, and/or the speed over the traveled distance.

The point in time for triggering fuel injection via the nozzles 16 and 17 can be determined by detecting the piston position. Detecting the piston position, however, also provides information on the compression ratio, which adjusts in each case, and which can depend directly on the spacing between the two pistons of a piston pair. In addition to the amount of energy tapped by the consumer via the energy converter and supplied by means of the fuel, the actual compression ratio can also be influenced directly by increasing or reducing the fuel supply.

Position detection for the piston pair 3 in cylinder 1 is the same as for the piston pair 4 in cylinder 2. Thus, if detection of the position during operation shows that the compression ratio in the cylinder that just fired, for example, cylinder 1, was barely sufficient to cause self-ignition of the fuel, then the controller 25 can direct a correspondingly higher amount of fuel to be injected into cylinder 2, which will result in a higher compression ratio for the next operating cycle in cylinder 1, which is triggered by cylinder 2.

Since inlet planes 8, 9 are arranged at one end of the cylinders 1, 2, respectively, and the exhaust openings 18, 19 are arranged at the other ends, respectively, a so-called "scavenging operation" occurs in connection with the piston movement, and results in a favorable longitudinal air flow through the cylinder. When the first piston 3.1, 4.1 of each piston pair 3, 4, respectively, moves across the inlet plane 8, 9, respectively, it exposes the inlet openings 8.1, 8.2 and 9.1, 9.2, respectively, which are located in the lower dead center region. As a result, fresh air flows into the cylinder, and initially pushes the exhaust gases out of the simultaneously opened exhaust openings 18, 19, respectively, by way of simple displacement.

In the exemplary embodiment shown in FIG. 1, in which each inlet plane 8, 9 comprises two rows of inlet openings 8.1, 8.2 and 9.1, 9.2, respectively, the scavenging operation starts while the first piston 3.1, 4.1 of each pair 3, 4 is undergoing the return movement caused by the expansion stroke. Since the charge air is not suctioned in, but rather is pressed in under pressure by the charger 12, the pressed-in fresh air displaces the exhaust gas from the region of the inlet plane 8, 9. With further movement of the first piston 3.1, 4.1 of each piston pair 3, 4 toward the lower dead center position, the second row of inlet openings 8.2, 9.2 (and each additional row of inlet openings that may be provided) is exposed. The amount of fresh air flowing in through these exposed openings, which depends on the predetermined charge pressure, ensures that the exhaust gas is completely scavenged from the cylinders 1, 2 before the inlet openings 8.1, 8.2, 9.1, 9.2 and exhaust openings 18, 19 are again closed off during the return movement of the pistons.

Since the inlet openings 8.1, 8.2 and 9.1, 9.2 of each inlet plane 8, 9, respectively, are in the form of ports (due to the finite thickness of the cylinder walls), it is possible to achieve a tangential inflow of air into the cylinders 1, 2. For example, the first row of inlet openings 8.1, 9.1 may be angled to create an air swirl in each of the cylinder chambers. The second row of inlet openings 8.2, 9.2, can be arranged radially to ensure consistent filling of the core region of each combustion chamber with fresh air, and to provide consistent scavenging of exhaust gasses over the complete cylinder cross section in the direction of the exhaust openings.

As described above, the injection openings of the injection nozzles 16, 17 are covered during movement of the first piston 3.1, 4.1 of each pair 3, 4 toward the upper dead center position, when the compression is still fairly low. Due to this arrangement, the injection openings of the injectors are protected against hot combustion gases, and also against the rising pressure inside the combustion chamber. As a result, a low-pressure injection system can be used. In this case, the injection nozzles 16, 17 can be positioned further away from the associated first row of inlet openings 8.1, 9.1, increasing the distance to the first piston 3.1, 4.1, such that fuel can preferably be injected toward the piston bottom and in the direction of the inlet plane. Due to the strong swirling of air in the inlet flows, which are still under pressure, the injected fuel is mixed intensively in the chamber. This intensive mixing occurs in particular if, during the expansion stroke in the direction toward the lower dead center position, the inlet openings that can discharge tangentially, for example, are exposed first by the first piston and are closed off last during the compression stroke of the first piston, so that the swirling movement is maintained during the "opening time."

It may also be advantageous for the injection nozzle 16, 17 openings to discharge into one of the air-inlet openings, so that fuel enters the combustion chamber supported by air. The fuel supply can accordingly be controlled by means of the air inlet openings in different inlet planes.

The arrangement can further be modified such that a basic fuel load is either injected or supplied via a carburetor to the intake port arrangement 10, 11, and only a partial fuel quantity may be required for stabilization, which partial quantity may be injected for a "precise adjustment" via direct injection into the combustion chamber. This again demonstrates the advantage of fuel injection into the inlet plane of the cylinders, since it prevents excessive heating of the injection nozzles, which are covered by the piston during combustion, and reduces the need for cooling through the amount of fuel injected. As a result, even small amounts of fuel can be injected.

FIGS. 2–5 schematically illustrate the sequential steps for the above-described scavenging operation with respect to the exemplary embodiment shown in FIG. 1. FIG. 2 illustrates the movement of pistons 3.1, 3.2 just prior to the end of the expansion stroke, with the exhaust gas shown with dashes. As the piston moves from the position shown in FIG. 2 to the position shown in FIG. 3, the inlet openings 8 are uncovered by the movement of piston 3.1, and the exhaust openings 18 are uncovered by the movement of piston 3.2. This allows fresh air to be pushed into the chamber of cylinder 1 by the charger 12 (shown in FIG. 1). The fresh air is depicted in the figures by crosses.

FIG. 3 shows the pistons 3.1, 3.2 in the lower dead center position at the moment of movement reversal, which is the instant when the fuel supply starts. The fuel is injected toward the bottom of piston 3.1 by way of the injection nozzle 16, resulting in an intensive mixture with the fresh air that continues to flow in through air inlets 8. A highly homogeneous fuel-air mixture results, which is represented in the figures by a cross inside a circle.

As a result of the scavenging operation, enough fresh air is pushed into the cylinder chamber so that just before the air inlets 8 and the exhaust opening 18 are closed off by the two pistons 3.1, 3.2, a small amount of fresh air is pushed behind the displaced exhaust gas into the exhaust opening 18. As soon as the inlet opening 8 and the exhaust opening 18 are again closed off, the compression operation takes place as shown in FIG. 5, wherein the fuel-air mixture is compressed and is ignited either through self-ignition or external ignition once the critical compression ratio is reached.

It can be advantageous for the exhaust treatment, explained in further detail below, to have a small amount of fresh air pushed into the exhaust port during the scavenging operation due to the longitudinal flow through the cylinder inside chamber. As shown schematically in FIG. 6, the two exhaust ports advantageously converge in a mixing device 14 from which the exhaust gas is subsequently discharged by way of a feed line 15 to the exhaust gas turbine 13.

Figure 6:
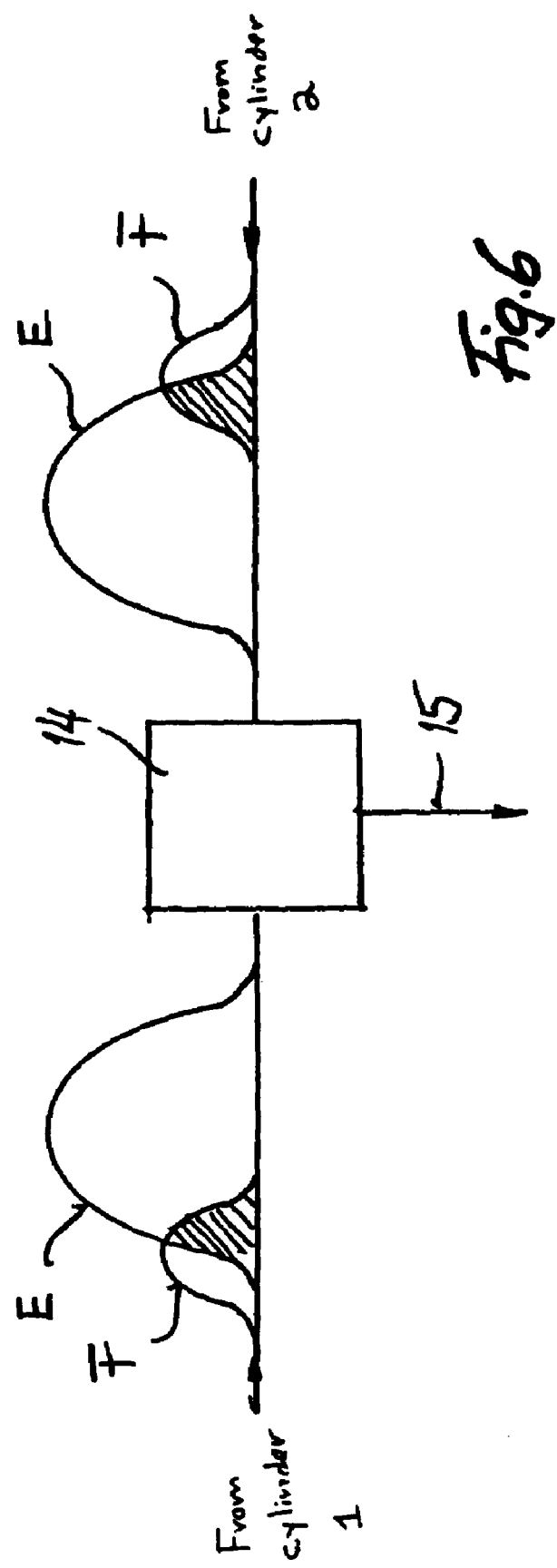
FIG. 6 schematically shows gas flow in two exhaust gas lines which converge in a mixing device.

As previously described and shown schematically in FIG. 6, the exhaust gas E is initially pushed out into the exhaust ports during each scavenging operation and can be followed by a small amount of fresh air F which mixes with the exhaust gas in the fringe region. As indicated in FIG. 6, the exhaust gas from the two cylinders enters the mixing device 14 in separate, successive batches, corresponding to the operating cycle. The pressure pulsation of the exhaust gas flow can be reduced in the mixing device 14.

By adjusting the fuel supply via control device 25, the exhaust gas E can have an air ratio of approximately Lambda= 0.9. By correspondingly adjusting the charge pressure, it is possible to maintain the amount of fresh air F pushed into the exhaust ports 20, 21 during the scavenging operation at about approximately 10% of the amount of pushed-out exhaust gas E. When the exhaust gas E and the fresh air F are combined in the mixing device 14, for example, it is possible to have a resultant air ratio of approximately Lambda=1.0 in the mixing device 14, as is required for an exhaust gas cleaning operation aided by a controlled 3-way catalytic converter.

Figure 7:
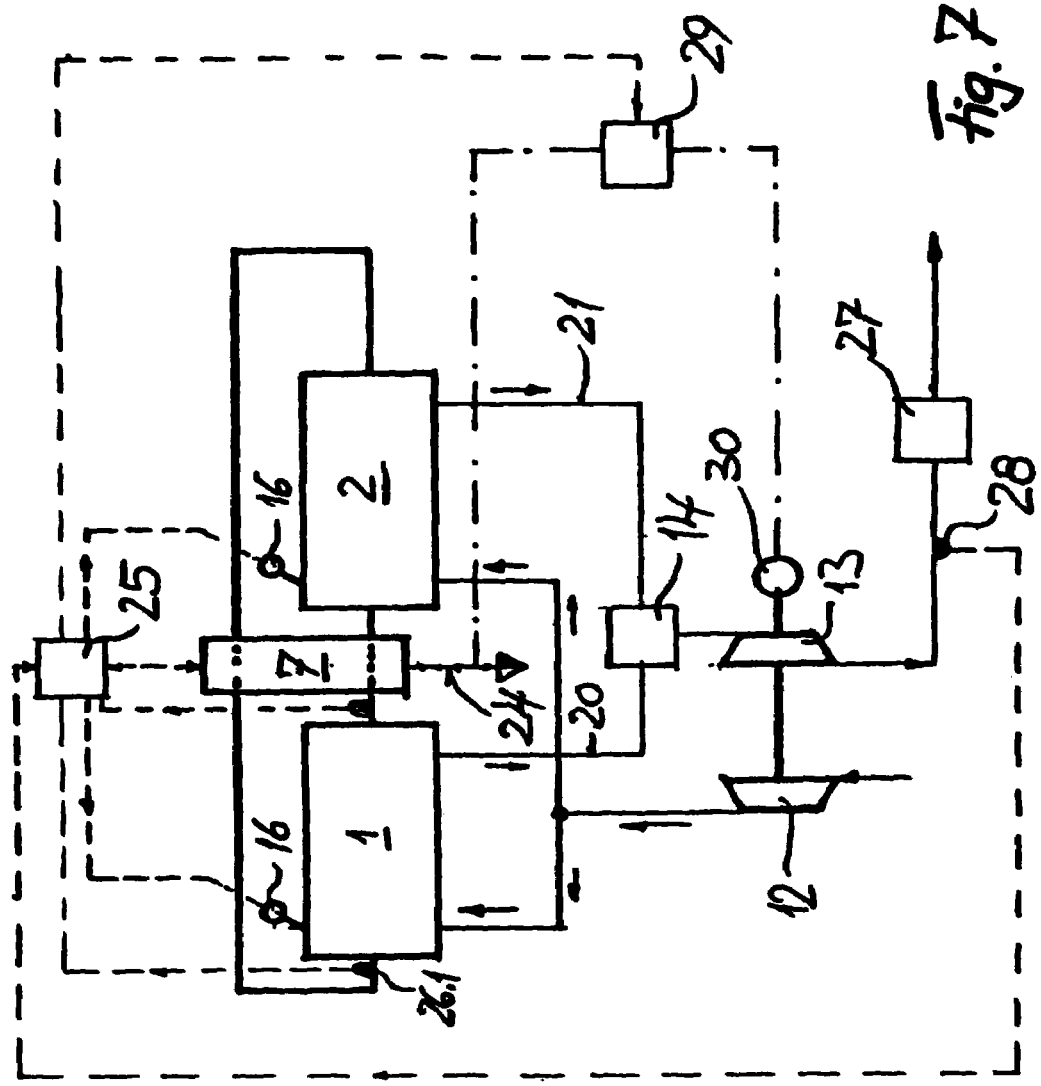
FIG. 7 shows a piston internal combustion engine according to FIG. 1, provided with a controlled 3-way catalytic converter.

FIGS. 7 and 8 represent circuit arrangements for an internal combustion engine according to the invention having an exhaust gas cleaning feature. The individual parts of the internal combustion engine are shown in FIGS. 7 and 8 schematically, but reference can be made to FIG. 1 for further details.

FIG. 7 shows a circuit arrangement for an exemplary exhaust gas cleaning operation by way of a controlled 3-way catalytic converter 27, to which the exhaust gas is supplied via the exhaust gas turbine 13. The mixed exhaust gas and air mixture flowing through the mixing device 14 is further homogenized in the exhaust gas turbine 13, so that an exhaust gas and air mixture having a ratio of approximately Lambda=1.0 is present, provided the fuel supply is adjusted accordingly.

The air ratio in the exhaust gas can be monitored in the standard way with a Lambda probe 28, with the measured value being supplied to the control device 25.

The use of a two-stroke internal combustion engine having free opposed pistons of the above-described type, which does not utilize forced guidance of the pistons, may require complex control. As a result, the position and speed of the pistons, the air ratio in the exhaust gas, and the load 24 that is tapped at the energy converter 7, may need to be monitored by the control device 25. The primary variable for the fuel supplied by the injection nozzles 16, 17 is usually the load 24 tapped at the energy converter 7 which, to a certain degree, functions to balance the compression ratio that freely adjusts as a result of the free piston movement.

The exhaust gas turbine 13 and thus the charger 12 can additionally be driven or stopped with the aid of an electric motor 30, also operable as a generator, and a corresponding auxiliary control 29. This may provide additional or alternative control over the air ratio for the exhaust gas before it enters the 3-way catalytic converter 27, for example, in the instance where the fuel supply is predetermined by the tapped charge. For the exemplary embodiment of an electric generator functioning as energy converter 7, power can be supplied to the electric motor 30 in the form of electrical energy supplied by the energy converter 7 (when electric motor 30 is driving the charger 12) or can be stored therein (when electric motor 30 is braking the charger 12). With other types of energy converters, the motor 30 can be supplied with electrical energy by means of an auxiliary power source.

FIG. 8 shows an internal combustion engine according to FIG. 1 with a different type of exhaust-gas catalytic converter. According to this exemplary embodiment, separate NOx catalytic converters 31.1, 31.2 are installed on the exhaust gas ports 20, 21 (shown in FIG. 1), and the catalytic converters 31.1, 31.2 discharge into the mixing device 14. The exhaust gas from both cylinders is mixed in the mixing device 14, and is subsequently fed downstream to an oxidation-type catalytic converter 32 by exhaust turbine 13. The amounts of hydrocarbon and carbon monoxide in the exhaust gas flow are oxidized in catalytic converter 32.

As shown and described with respect to FIGS. 1–6, exhaust gas E and subsequently a correspondingly small amount of fresh air A may be introduced into the two NOx catalytic converters 31.1, 31.2. A slight adjustment of the air ratio to approximately Lambda=1 in the exhaust-gas ports may not be necessary in this case, since the NOx catalytic converters 31.1, 31.2 can react quickly enough to reduce any excessive amounts of air, so that an exhaust gas with an air ratio of approximately Lambda>1.0 can flow into the mixing device 14 and be oxidized in the oxidation-type catalytic converter 32.

The above description of the exhaust gas ratios with exhaust gas discharge and exhaust gas cleaning shows that, in addition to the previously described control options, exhaust gas strategies can be developed that permit a relatively fast reaction to changes in the load. An internal combustion engine of this type, having a downstream-connected energy converter, is preferably operated in a constant operating state, such that the control device only needs to change the fuel supply and the Lambda air ratio of the exhaust gas if there is a change in the accepted load, for example, from full load to partial load and vice versa.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:
1. A two-stroke internal combustion engine comprising:
   a first cylinder and a second cylinder arranged on a common axis;
   a first piston pair comprising a first piston and a second piston located in the first cylinder and defining a first combustion chamber, the first piston and the second piston of the first piston pair moving in opposite directions within the first cylinder;
   a second piston pair comprising a first piston and a second piston located in the second cylinder and defining a second combustion chamber, the first piston and the second piston of the second piston pair moving in opposite directions within the second cylinder, wherein the first piston of the first piston pair is connected to the second piston of the second piston pair by a first connecting rod, and the second piston of the first piston pair is connected to the first piston of the second piston pair by a second connecting rod; and
   a fuel supply connected to at least one of the first cylinder or the second cylinder, the fuel supply comprising an injection nozzle that injects fuel along an axis that is angled toward the first piston with respect to the common axis;
   wherein at least one of the first cylinder or the second cylinder includes a first end and a second end, and includes a plurality of inlet openings defining an inlet plane proximate the first end, and a plurality of exhaust openings located proximate the second end, and the fuel supply injects fuel proximate to the first end.
2. The two-stroke internal combustion engine of claim 1, wherein the plurality of inlet openings includes a first row of inlet openings defining a first plane and a second row of inlet openings defining a second plane, wherein during an operation stroke of the engine, the piston uncovers the first row of openings before uncovering the second row of openings, and fuel and air are injected through at least one of the first row of inlet openings or the second row of inlet openings.

3. The two-stroke internal combustion engine of claim 2, wherein the fuel supply comprises at least one injection nozzle that injects fuel directly into at least one of the first combustion chamber or the second combustion chamber upstream of the first inlet plane.

4. The two-stroke internal combustion engine of claim 1, further comprising a port arrangement in communication with the inlet plane, wherein the fuel supply is connected to the port arrangement.

5. The two-stroke internal combustion engine of claim 1, wherein the fuel supply injects fuel proximate to at least one of the inlet openings.

6. The two-stroke internal combustion engine of claim 1, wherein the fuel supply comprises at least one carburetor.

7. The two-stroke internal combustion engine of claim 1, wherein the fuel supply comprises at least one injection nozzle.

8. The two-stroke internal combustion engine of claim 1, wherein the fuel supply comprises at least one injection nozzle that injects fuel directly into at least one of the first or second combustion chamber.

9. The two-stroke internal combustion engine of claim 8, wherein the injection nozzle injects fuel into at least one of the first combustion chamber or the second combustion chamber upstream of an inlet plane.

10. The two-stroke internal combustion engine of claim 1, further comprising at least one charger adapted to supply air to the inlet openings.

11. The two-stroke internal combustion engine of claim 1, further comprising an exhaust gas catalytic converter in communication with the exhaust openings.

12. The two-stroke internal combustion engine of claim 1, further comprising a mixing device for mixing exhaust gases discharged from the first cylinder and the second cylinder.

13. The two-stroke internal combustion engine of claim 12, further comprising a NOx catalytic converter located upstream of the mixing device.

14. The two-stroke internal combustion engine of claim 12, further comprising an oxidation-type catalytic converter located downstream from the mixing device.

15. The two-stroke internal combustion engine of claim 12, further comprising a controlled 3-way catalytic converter located downstream of the mixing device.

16. The two-stroke internal combustion engine of claim 1, further comprising an energy converter connected to at least one of the first connecting rod or the second connecting rod.

17. The two-stroke internal combustion engine of claim 1, further comprising:
a sensor system adapted to detect the position, movement, and speed information of at least one of the pistons; and
a control device in communication with the sensor system, wherein the control device controls the operation of the engine based on the information detected by the sensor system.

18. The two-stroke internal combustion engine of claim 1, further comprising an intake port in communication with the inlet openings.

19. The two-stroke internal combustion engine of claim 1, further comprising an exhaust port in communication with the exhaust openings.

20. A two-stroke internal combustion engine comprising:
a first cylinder and a second cylinder arranged on a common axis;
a first piston pair comprising a first piston and a second piston located in the first cylinder and defining a first combustion chamber, the first piston and the second piston of the first piston pair moving in opposite directions within the first cylinder;
a second piston pair comprising a first piston and a second piston located in the second cylinder and defining a second combustion chamber, the first piston and the second piston of the second piston pair moving in opposite directions within the second cylinder, wherein the first piston of the first piston pair is connected to the second piston of the second piston pair by a first connecting rod, and the second piston of the first piston pair is connected to the first piston of the second piston pair by a second connecting rod; and
a fuel supply connected to at least one of the first cylinder or the second cylinder;
wherein at least one of the first cylinder or the second cylinder includes a first end and a second end, and includes a first row of inlet openings defining a first plane proximate the first end and a second row of inlet openings defining a second plane proximate the first end, and a plurality of exhaust openings located proximate the second end, and the fuel supply injects fuel proximate to the first end;
further wherein during an operation stroke of the engine, the piston uncovers the first row of inlet openings before uncovering the second row of inlet openings, and fuel and air are injected through at least one of the first row of inlet openings or the second row of inlet openings.

21. A two-stroke internal combustion engine comprising:
a first cylinder and a second cylinder arranged on a common axis;
a first piston pair comprising a first piston and a second piston located in the first cylinder and defining a first combustion chamber, the first piston and the second piston of the first piston pair moving in opposite directions within the first cylinder;
a second piston pair comprising a first piston and a second piston located in the second cylinder and defining a second combustion chamber, the first piston and the second piston of the second piston pair moving in opposite directions within the second cylinder, wherein the first piston of the first piston pair is connected to the second piston of the second piston pair by a first connecting rod, and the second piston of the first piston pair is connected to the first piston of the second piston pair by a second connecting rod;
a fuel supply connected to at least one of the first cylinder or the second cylinder; and
a port arrangement connected to the fuel supply;
wherein at least one of the first cylinder or the second cylinder includes a first end and a second end, and includes a plurality of inlet openings defining an inlet plane proximate the first end, and a plurality of exhaust openings located proximate the second end, and the fuel supply injects fuel proximate to the first end;
further wherein the port arrangement is in communication with the inlet plane.

* * * * *